April 29, 1947.  J. H. BROWN  2,419,532
SHAPING MOLD
Filed Aug. 6, 1943   3 Sheets-Sheet 1
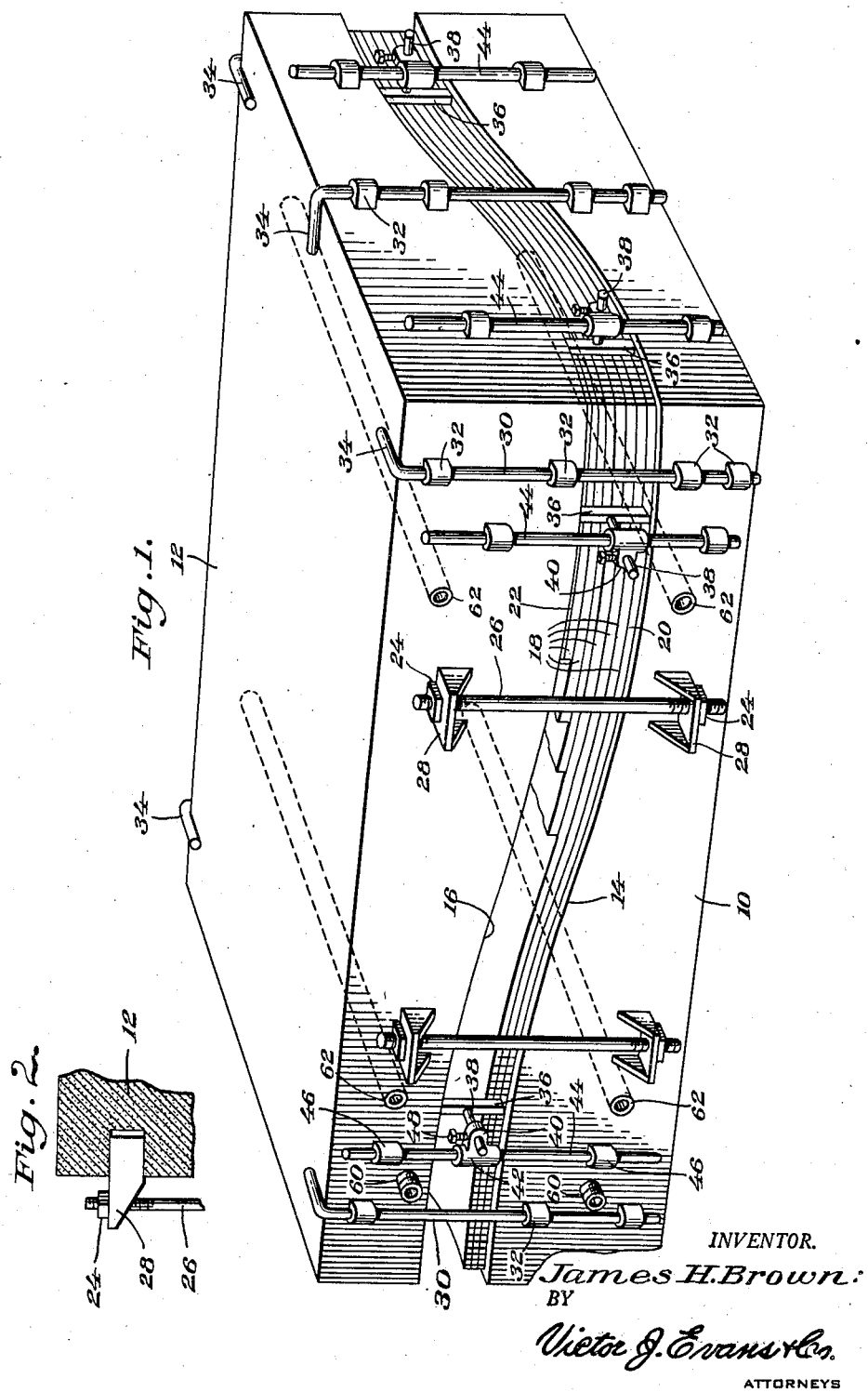
INVENTOR.
James H. Brown
BY
Victor J. Evans & Co.
ATTORNEYS

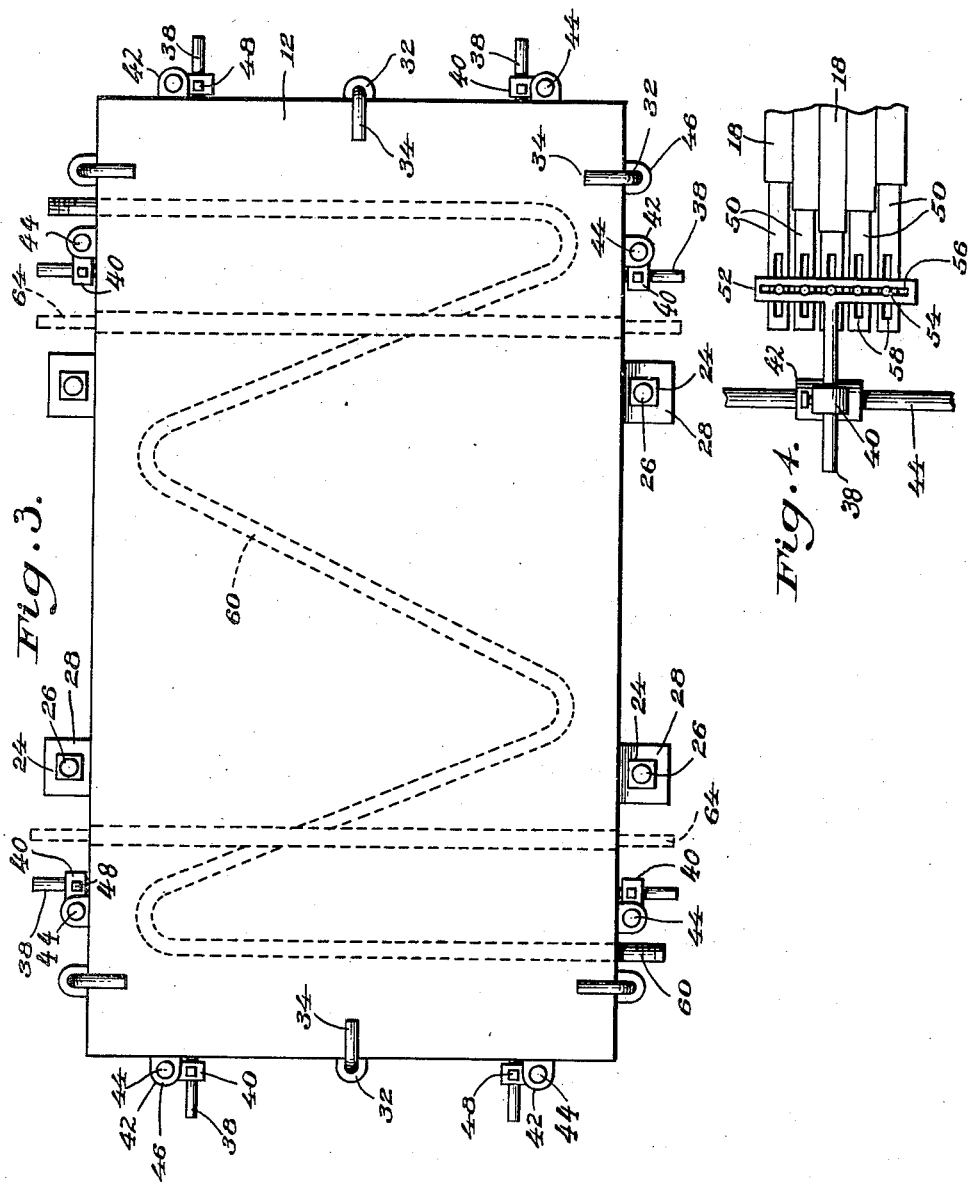

April 29, 1947.  J. H. BROWN  2,419,532
SHAPING MOLD
Filed Aug. 6, 1943  3 Sheets-Sheet 3
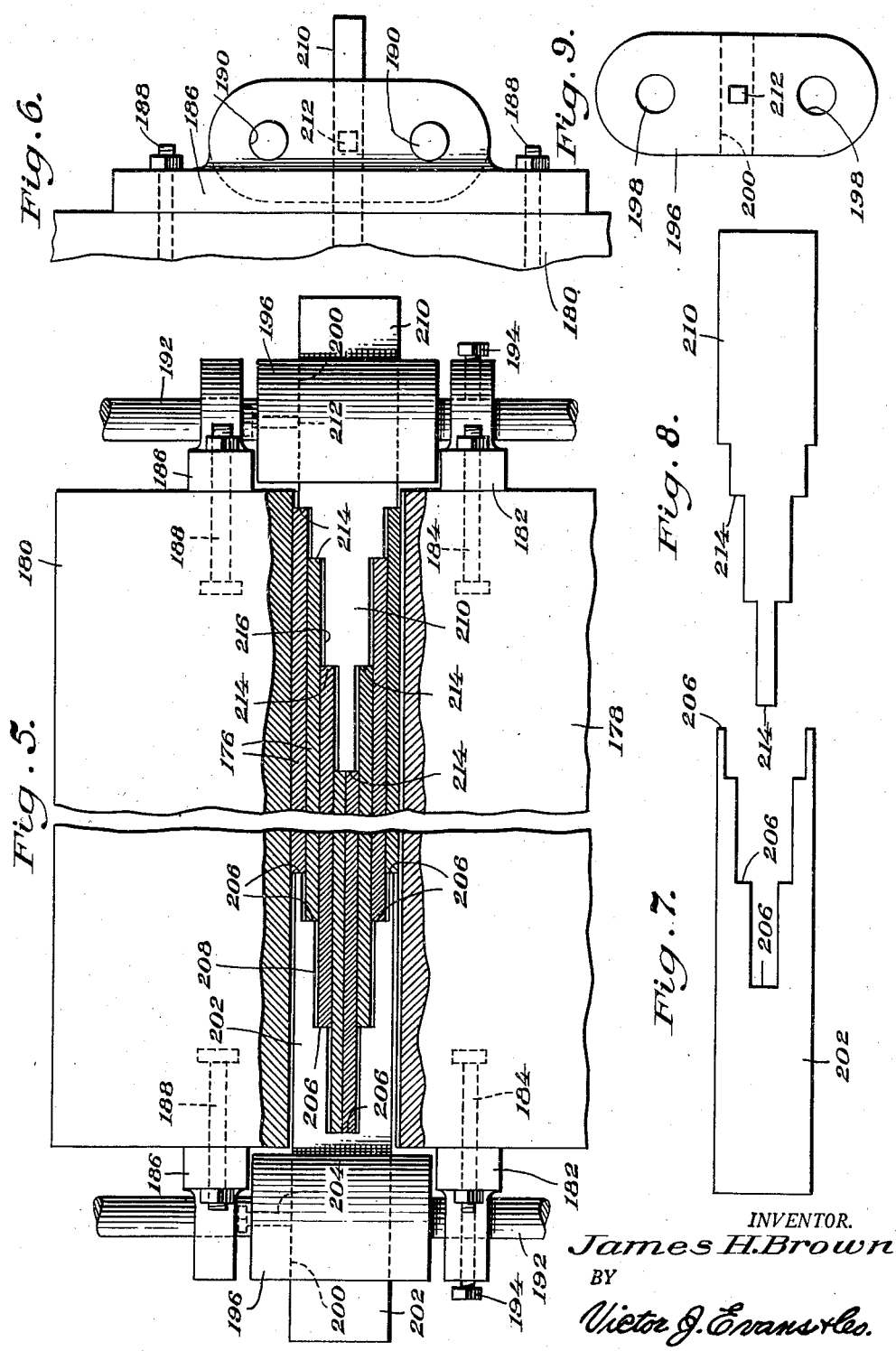
INVENTOR.
James H. Brown:
BY
Victor J. Evans & Co.
ATTORNEYS Patented Apr. 29, 1947

2,419,532

UNITED STATES PATENT OFFICE 2,419,532

SHAPING MOLD

James H. Brown, Seattle, Wash.

Application August 6, 1943, Serial No. 497,633

3 Claims. (Cl. 144—281)

My invention relates to the shaping and contouring of laminated wood, plywood or veneer, and the molding of plastic materials, and has among its objects and advantages the provision of an improved mold and a method of making the same.

This application is a continuation-in-part of my patent on Shaping mold and method of making the same, No. 2,366,435 issued January 2, 1945.

Considerable difficulty has been experienced in the construction of iron and steel molds in the nature of a shoe and a die for bending and shaping structural materials, particularly in cases where the shapes are in the nature of bends or geometrical curves in both single and compound curvatures. In the case of iron or steel, each mold part has to be separately cast from a separate pattern. This method does not insure, in the molding of each part, a perfect conformity and contour. Such methods require much expensive machine work on both the die and the shoe in order that they shall closely conform to and contour with each other. Then, too, there is the further problem of warping and shrinking peculiar to metallic shoes and dies.

Accordingly, an object of my invention is to provide a novel shoe and die combination wherein the two parts may be accurately shaped to closely conform to and contour one with the other, and in which the parts are constructed of material which entirely eliminates objectionable warpage and shrinkage.

A further object is to provide a mold of this character for the making of laminated structures, wherein a number of sheets of the aforesaid materials are secured in superimposed relation by cementing or gluing under pressure, and a means is provided to hold the opposite side or end edges of the sheets in an offset, i. e., stepped, relation one with respect to the other, so that the edges of juxtaposed structures can be fitted together in overlapping relation.

In the accompanying drawings:

Figure 1 is a perspective view of a mold in accordance with my invention.

Figure 2 is a sectional detail view of a portion of one of the mold clamps.

Figure 3 is a top plan view.

Figure 4 is a view illustrating a set of adjustable fingers at one side or end of the mold attached to the adjustable supporting guide for holding the elements of a laminated assembly in offset relationship one with the other.

Figure 5 illustrates a modification in the work or material guide means.

Figure 6 is a top view of one end of the structure of Figure 5.

Figure 7 is a view of one of the modified guide members.

Figure 8 is a view of a companion modified guide member.

Figure 9 is a view of a holder for the members of Figures 7 and 8.

In the embodiment of the invention selected for illustration, I make use of a concrete shoe 10 and a concrete die 12. The shoe 10 is provided with a shaping and bending face 14 and the die 12 is provided with a correspondingly shaped face 16. Figure 1 illustrates sheets 18 of plywood arranged between the faces 14 and 16 to be bent to the contour of the faces and united into a unitary structure by grooved joints between the respective plywood sheets. A sheet 20 of pliable material, such as rubber, is positioned between the face 14 and the lowermost plywood sheet 18. A similar pliable sheet 22 is placed between the face 16 and the uppermost plywood sheet 18. In lieu of the sheets 20 and 22, the faces of the shoe 10 and die 12 may be coated with rubber. The sheets 20 and 22 are employed only in such cases as where the materials being fabricated are characterized by slight or pronounced irregularities which prevent effective pressure from being applied throughout the entire area of the assembly. In most cases the pliable sheets may be dispensed with and the structural materials arranged for direct engagement with the two forming faces 14 and 16.

After application of glue to the engaging faces of the sheets 18, pressure is brought to bear on the assembly through tightening of nuts 24 on rods 26 passing through openings in lugs 28 partially embedded in the concrete of the respective shoe and die 10 and 12. This pressure condition serves as a holding means until such time as the required pressure is applied by means of hydraulic or other external means of like force and strength. The assembled sheets are maintained under pressure until the glue has dried thoroughly. When the glue has been properly dried, the sheets 18 are secured firmly one to the other and the assembly has a contour conforming to the faces 14 and 16.

In order to position and retain the die 12 in true vertical relationship with the shoe 10, guide rods 30 are slipped through eyes 32 in both the shoe and the die, which rods are preferably hooked at 34 to engage the upper face of the die 12 to be restrained from downward longitudinal movement. The eyes 32 are also partly embedded in the concrete of the shoe and the die.

In securing the sheets 18 into a unitary structure by means of glue, the glue frequently acts as a lubricant which causes the sheets to shift laterally when pressure is applied to the assembly. In cases where it is desirable to restrain the sheets from such relative lateral displacement, aligning bars 36 are brought into engagement with the opposite edges of the sheets 18, which bars are secured to shafts 38 supported in eyes 40 on sleeves 42 slidably mounted on rods 44 held in eyes 46 anchored in the concrete of the shoe and the die. The shafts 38 are movable longitudinally in the eyes 40 and may be secured in different positions by set screws 48. Sets of bars 36 of different lengths may be provided for use in bending and shaping materials of different total thicknesses.

In cases where it is desirable to arrange the edges of the sheets 18 in offset relationship, groups of spacing fingers 50, see Figure 4, may be employed at the opposite sides or ends of the mold. Each group of fingers 50 is carried by a bar 52 corresponding to one of the bars 36, and are adjustable horizontally and vertically through the medium of bolts 54 which pass through a slot 56 in the bar 52 and through slots 58 in the respective fingers; the fingers of the groups at one side or end of the mold being offset in the reversed direction from that of the fingers of the groups at the opposite side or end of the mold. The bars 52 may be substituted for the bars 36 in the eyes 40. The offset arrangement of the sheets 18 in Figure 4 provides an edge contour wherein the respective sheets of one assembly may be joined in overlapping relationship with the sheets in another such assembly to provide a strong joint.

Figures 5 through 8 illustrate a further modification in the work guiding means. Figure 5 illustrates a plurality of sheets 176 arranged in overlapping relationship between the shoe section 178 and the die section 180, as when being glued or cemented into a unitary structure. To the shoe section 178 are connected two gage brackets 182, which brackets are located on opposite faces of the shoe and secured thereto by bolts 184 embedded in the material of the shoe. Two similar gage brackets 186 are attached to the die 180 by bolts 188. The brackets 186 are located vertically above the brackets 182. Each bracket is provided with two bores 190, the bores in the brackets 182 being respectively coaxially arranged with the bores in the brackets 186. Gage guide rods 192 are slipped through the aligned bores 190 and preferably made secure to the brackets 182 by set screws 194.

A gage holding body 196 is mounted upon each set of rods 192. Bores 198 are provided in the bodies 196 for loosely receiving the rods 192.

Each of the bodies 196 is provided with a transverse rectangularly-shaped opening 200. A female tongue-forming guide 202 is inserted in the slot 200 in one body 196 and made secure by a set screw 204. This guide is provided with shoulders 206 so spaced and arranged as to abut the sheets 176 in the laterally offset relationship of Figure 5 to provide a tongue formation 208. Guide 202 extends to a position between the shoe 178 and the die 180 and its vertical dimension is narrower than the spacing between the shoe and the die to provide clearance in the closest spacing of the shoe and the die.

A male work guide 210 is inserted in the other body 196 and may be made secure by a set screw 212. This work guide is provided with shoulders 214 so arranged as to engage the opposite edges of the sheets 176 when the latter are relatively laterally offset in the manner of Figure 5 and in conformity with the work guide 202. The work guide 210 is also narrower than the closest spacing between the shoe and the die, and either work guide 202 or 210 may be adjusted to bring the edges of the sheets 176 into desired holding engagement with the respective shoulders 206 and 214 to restrain the sheets 176 from relative lateral shifting when pressure is applied to the assembly. While the set screws 194 firmly secure the rods 192 against vertical movement, the brackets 186 are free to move longitudinally on the rods 192, as when the die 180 is moved vertically relatively to the shoe 178. When the sheets 176 have been thoroughly secured into a unitary assembly, the assembly is characterized by a tongue 208 along one edge and a groove formation 216 along its opposite edge for receiving the tongue formation 208 on another assembly. Thus sections of assemblies may be effectively joined one to the other and with the respective sheets of the assemblies overlapping one with the other.

While I have employed specific designs to illustrate the purpose, scope and function of my invention, I am not to be restricted to these, provided always, of course, that I confine such other designs as I may employ within the scope and principle of my invention.

I claim:

1. A shaping mold for gluing sheets of material together in laterally offset relation, comprising an aligned shoe and die, each having coacting pressure faces, vertically aligned brackets on opposite sides of said shoe and die, transversely aligned nutted clamp rods carried in certain of said brackets, transversely aligned guide rods carried in certain other of said brackets, guide bodies mounted on said guide rods and each having a transversely disposed opening, sheet guides receivable in said openings, and a set of stepped shoulders carried at the inner side of each of said sheet guides, the set of shoulders at one side of the mold being stepped in a reversed direction from that of the opposite set, said sets of shoulders projecting inwardly between said shoe and die and engaging the adjacent edges of the sheets to hold the same in a correspondingly stepped relation, whereby the oppositely stepped edges of juxtaposed sheets can be fitted together in overlapping relation, said shoe and die being relatively shiftable for pressure engagement with said sheets by a tightening up on the nuts of said clamp rods.

2. The invention as in claim 1, with each of said sheet guides comprised in a horizontal shank adjustably secured in the transverse opening of its respective guide body and a vertically elongated member at its inner end, and said shoulders in the form of several elongated members mounted for independent horizontal adjustment on said vertical member.

3. The invention as in claim 1, with each of said sheet guides comprised in a horizontal shank adjustably secured in the transverse opening of its respective guide body and a vertically elongated member at its inner end, said member being longitudinally slotted, and said shoulders in the form of several elongated bars each having a horizontal slot adjacent its outer end, and fastenings engaged through the slots of said member and said bars to secure the bars in horizontally adjusted positions.

JAMES H. BROWN.

REFERENCES CITED

The following references are of record in the file of this patent:

UNITED STATES PATENTS

| Number | Name | Date |
|---|---|---|
| 242,249 | Barthelmes | May 31, 1881 |
| 228,878 | Denninger | June 15, 1880 |
| 2,311,561 | Miller | Feb. 16, 1943 |
| 1,850,517 | Lacey | Aug. 9, 1932 |
| 2,151,880 | Wiederkehr | Mar. 28, 1939 |
| 2,252,040 | Fischer-Schmutz | Aug. 12, 1941 |
| 977,804 | Knilans | Dec. 6, 1910 |
| 1,907,083 | Meyercord et al. | May 2, 1933 |
| 2,322,962 | Dickson et al. | June 29, 1943 |
| 1,259,698 | Wilson | Mar. 19, 1918 |
| 616,322 | Hatteberg | Dec. 20, 1898 |
| 673,409 | Nichols | May 7, 1901 |
| 1,564,848 | Herschede | Dec. 8, 1925 |

FOREIGN PATENTS

| Number | Country | Date |
|---|---|---|
| 120,939 | British | Dec. 5, 1918 |
| 406,005 | British | Feb. 15, 1934 |